May 12, 1959 D. CLEGG 2,886,000
APPARATUS FOR AUTOMATIC AND SANITARY MILKING
Filed Dec. 5, 1955 2 Sheets-Sheet 1
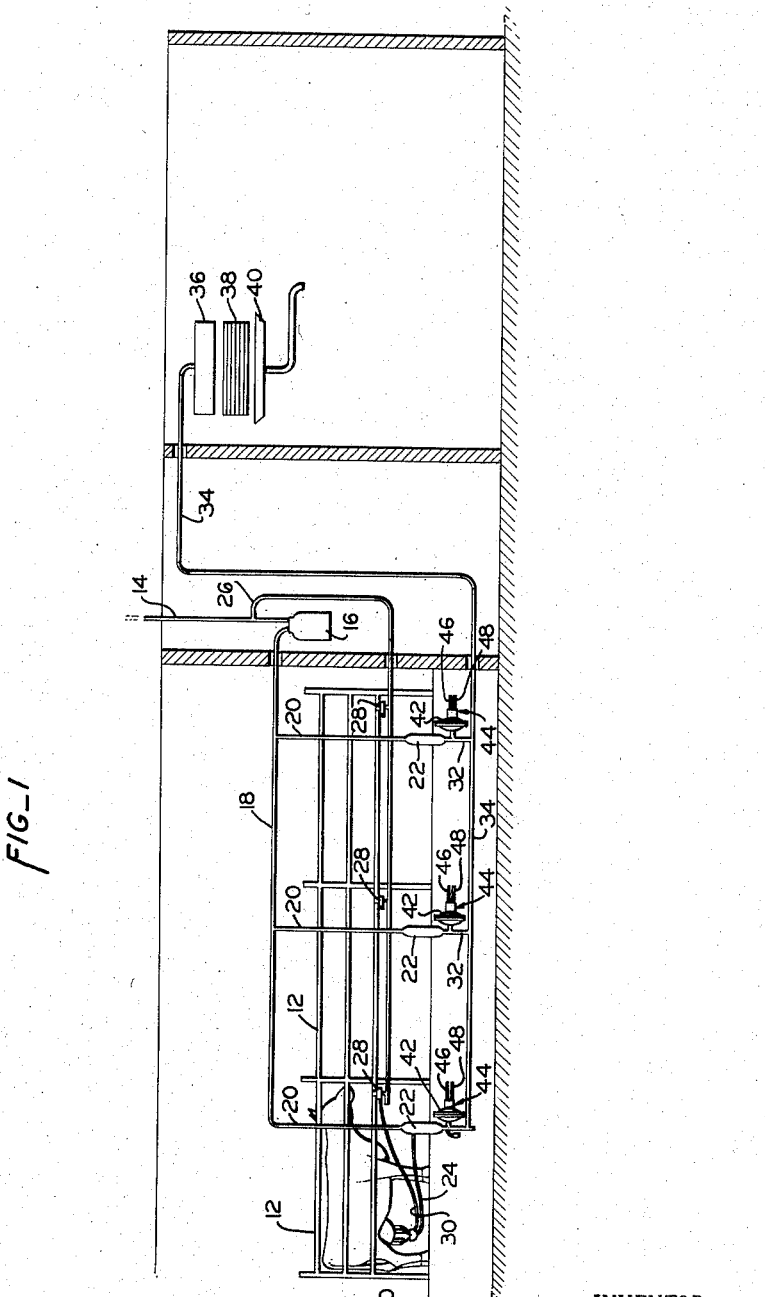
INVENTOR.
DOUGLAS CLEGG
BY Naylor & Neal
ATTORNEYS May 12, 1959
D. CLEGG
2,886,000
APPARATUS FOR AUTOMATIC AND SANITARY MILKING
Filed Dec. 5, 1955
2 Sheets-Sheet 2
FIG_2
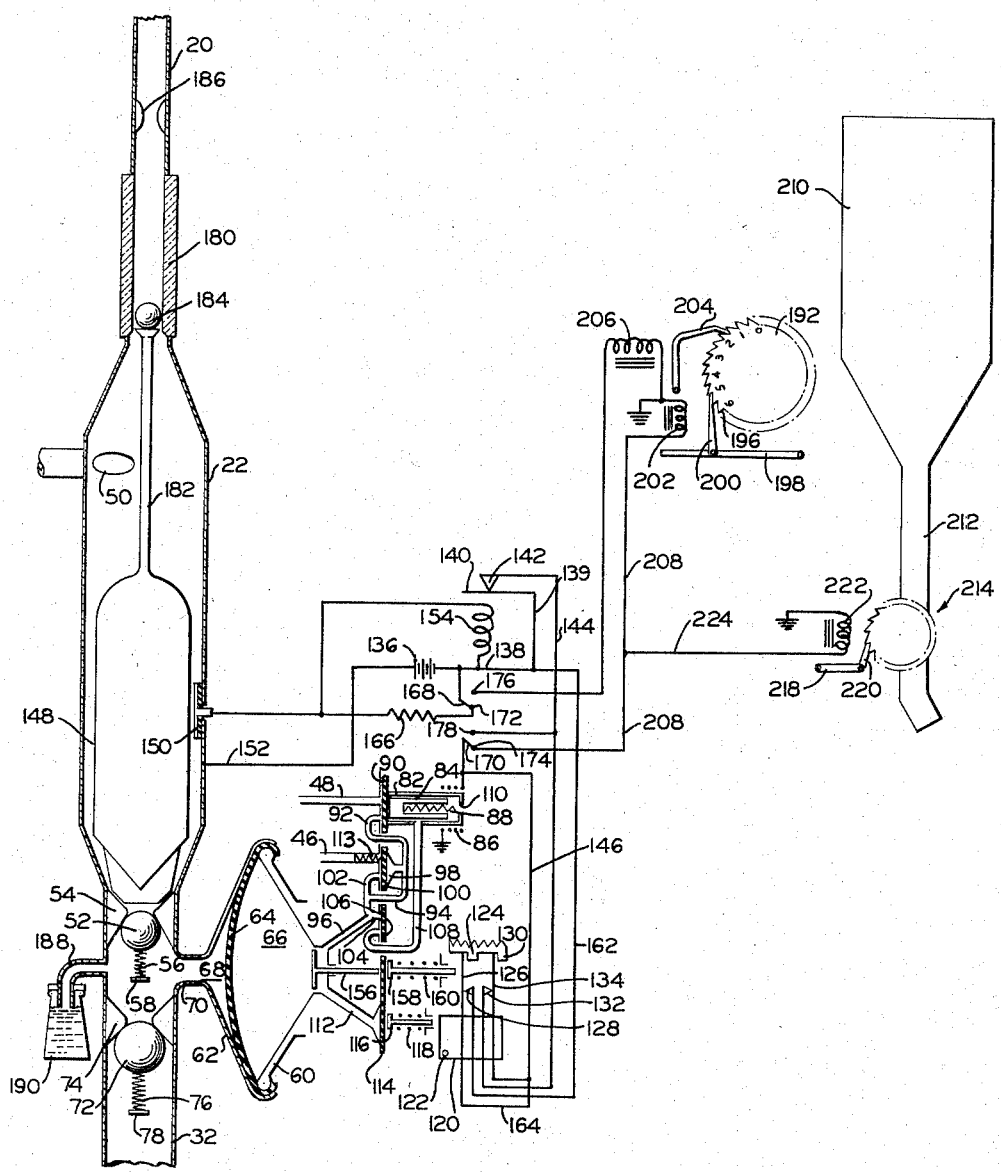
INVENTOR.
DOUGLAS CLEGG
BY Naylor & Neal
ATTORNEYS

United States Patent Office 2,886,000
Patented May 12, 1959

2,886,000

APPARATUS FOR AUTOMATIC AND SANITARY MILKING

Douglas Clegg, Kellogg, Calif.

Application December 5, 1955, Serial No. 550,917

6 Claims. (Cl. 119—14.27)

This invention relates to the milking of cows, and more particularly to an improved method and apparatus for automatic and sanitary milking.

Present milking practice, based on available equipment of the "pipeline milker" type, is to milk a plurality of cows into a common sanitary line, the transferring of the milk from the milking area by means of vacuum, and the subsequent releasing of the milk to atmospheric pressure conditions through the employment of a single releaser, or air separator. Usually, the transfer of the milk under vacuum conditions from the cow through the releaser to a storage tank is accomplished by a pipeline system which embodies a vertical riser extending from each cow to the common sanitary line which extends to the storage tank. This mode of transferring milk from the cow to the storage tank is usually disadvantageous from one or more of the following standpoints: milk quality; cow health; and good milking practice.

The quality of milk may be adversely affected because rancidity is induced in milk by the turbulent mixing of air and milk under vacuum conditions. The vertical raising of the milk is one cause of this turbulence. Another cause is the injection of air into the system which is caused by leaking cups, small air intakes which are built into the claws, and leaks in the long sanitary transport line which may be in turn caused by fittings which have become loosened through repeated contractions and expansions of the metal parts from the condition of cold operating temperature to the condition of hot cleaning temperature. Actually, it is necessary for the best physical operation of present pipeline milker systems to admit air into the system in order to "pull the milk" and clear vital areas of the system, such as milk claws and valves, of congestion. Inasmuch as air enters at different points in the system, and particularly along the essentially horizontal sanitary transport line, in a sporadic manner, the vacuum balance is interrupted at air leakage points and the milk in these areas rushes to areas of greater vacuum. The resultant thrashing action of the milk as it mixes with the injected air causes a further induction of rancidity in the milk.

Also, the fluctuating vacuum conditions in the system may well affect the health of the cows which are milked by that system. The milking cup rubber inflation is contracted and expanded by an alternation of changing pressures from two different sources of vacuum. The source that is supplied to the space between the metal cup and the rubber inflation is an independent source which is quite constant and which is caused to alternate by a pulsator. The source for the inside of the rubber inflation acts by way of the releaser receptacle, the milk line, milk valve, milk hose, milk claw, and the hose end of the rubber inflation. It is desirable that this second vacuum source be maintained as constant as possible in order to counteract the positive and relatively unchanging vacuum produced from the independent source. The condition of the teats and udder of the cow is impaired by such fluctuating vacuum conditions and the resulting inconstant action of collapse of the rubber inflation.

From the foregoing, it will be seen why good milking practice is obtainable with present day pipeline milkers in varying degrees, depending upon the degree of constancy of the vaccum condition in the milk line. Formerly, when cows were milked with pails, a storage of vacuum in the container near the cow helped to maintain a constant vacuum condition in the milk line, but in present day pipeline milker systems the vacuum storage, so-called, is in the pipeline and the releaser receptacle which is usually disposed at the far end of the pipeline. When a large amount of air is injected into the pipeline system, it is not unusual for all of the claw units to drop to the floor before such air injection can be stopped.

These and other shortcomings and disadvantages of the conventional pipeline milker systems are overcome by the subject invention.

An object of this invention is to provide a pipeline milker system in which the milk from each claw travels downwardly a short distance to an individual vacuum releaser, and wherein separate positive displacement pumps, one for each releaser, are provided to pump the milk through a common sanitary feedline to a point of ultimate delivery, such as a storage tank. The achieving of this object provides the following advantageous results: vacuum fluctuations arising through milk flow in the main line and from the vertical lifting of the milk from the udders to the line are virtually eliminated; a near source of available vacuum will give greater constancy to the milking vacuum pressures, and the downward travel of the milk to the releaser, or the slight upward movement of the milk to the releaser in the event that it is not possible in a given instance to mount the releaser below the udder level, eliminates the need for injecting air to the claw; air accidently injected into the claw line will be promptly eliminated in the releaser receptacle before it is allowed to be mixed very long with milk under vacuum; small leaks in the main line will be immaterial, as air will not be sucked into the line due to the fact that the line is maintained under a pressure slightly above atmospheric pressure, and the milk may be pumped to where it will satisfy the convenience of the operator of the system and be discharged at any height without harm to it.

A further object of the invention is to provide a pipeline milker system embodying individual vacuum releasers having associated therewith individual positive displacement pumps of a very simple, efficient and leak-proof type, with the releasers being adapted to operate only when the volumetric capacity of the releaser is filled with an amount of milk equal to that which may be handled by full capacity stroke of the pump, except when the milking of the cow has been completed and the amount of the milk within the releaser is less than that which can be handled by one full stroke of the pump. The achievement of this object leads to the following advantageous results: a counter may be employed in conjunction with each individual pump to record the number of capacity strokes of the pump required to complete the milking of the cow, and this data can be readily converted into a figure which accurately represents the number of pounds of milk which have been given by each cow; and the diaphragm type pump employed, which requires no motor for its operation, is inexpensive, embodies relatively few working parts, and is easy to maintain in operating condition.

Other objects of the invention are: the provision of automatic sampling means in association with each individual releaser and pump combination; and the provision of automatic means for releasing feed to each cow in amounts directly related to the amount of milk produced, as evidenced by the number of strokes taken by each individual milking pump.

Further objects and advantages of the invention will be apparent from the following description taken in conjunction with the drawings forming part of this specification, and in which:

Figure 1 is a view in elevation of the pipeline milker system of the invention; and Figure 2 is a semi-schematic illustration of an individual releaser and pump combination, and the operation and control means therefor.

With reference to Figure 1, the pipeline milker system of the invention comprises a floor support 10 for the cows, a plurality of milking stalls 12, a vacuum line 14 leading from a source of vacuum, not shown, connected through an air separator 16 to line 18, a plurality of lines 20 interconnecting line 18 and vacuum releasers 22, claw lines 24 interconnecting the cows and releasers and adapted to deliver milk to the releasers, a line 26 connected to vacuum line 14 and having associated therewith a plurality of pulsator units 28 which are connected to the pulsator lines 30 of the claws, lines 32 interconnecting releasers 22 and the milk transport line 34 which delivers the milk to any desired end point, such as bottle filling apparatus, not shown, after passage through such as a pasteurizer 36, cooler 38, and holding vat 40, and positive displacement diaphragm-type pumps 42 connected to lines 32 and adapted to be operated through valving mechanisms indicated generally at 44 by vacuum lines 46 and pressure lines 48 which are connected, respectively, to a source of vacuum and to a source of pressure, not shown.

The milker system thus far described is believed to be broadly novel over the conventional pipeline milker systems. Milk is induced into the releasers 22 by the pulsating vacuum condition in lines 30 and the vacuum condition in lines 24, and, as will be hereinafter more specifically described, the milk is drawn into lines 32 during the vacuum strokes of pumps 42 and pumped from lines 32 into transport line 34 during the pressure strokes of pumps 42. The vacuum conditions in lines 24 and 30 are constant and equalized, and there is substantially no air-milk turbulence in the system. Also, since the vacuum is not applied to the transport line 34, the total length of the lines in the vacuum side of the milking system can be relatively short, thereby minimizing the leakage of air into the vacuum lines due to loose fittings, etc. In any case, such air leakage, unless it takes place in the preferably downwardly sloped lines 24, can have no deleterious effect on the milk, and if such leakage does take place in lines 24 no measurable degree of rancidity is induced in the milk. Such rancidity is induced to an objectionable extent for the most part when air and milk are moved upwardly in vacuum lines, rather than downwardly.

With reference to Figure 2 for more specific details of the vacuum releaser and pump arrangements and the operating and control system therefor, milk from a line 24 enters the releaser through port 50. Any accompanying air is separated therefrom and removed through the vacuum line 20. The milk is temporarily maintained within the releaser by a ball check valve 52 which is normally maintained against seat 54 by a spring 56, the lower end of which is mounted on a support arm 58 carried within line 32.

Pumps 42 are provided with complemental housings 60 and 62 having clamped therebetween a diaphragm 64, the latter dividing the pump into two chambers 66 and 68. Chamber 68 communicates with line 32 through conduit 70 at a point below ball check valve 52 and above another ball check valve 72. Valve 72 is normally maintained against seat 74 by spring 76, the lower end of which is mounted on a support arm 78 carried within line 32.

When pump chamber 66 is connected to vacuum line 46, in a way and through means to be shortly described, diaphragm 64 is moved against the face of housing 60, thereby causing valve 52 to be moved away from seat 54 and causing chamber 68 and line 32 above valve 72 to be filled with milk. When pump chamber 66 is connected to pressure line 48, in a way and through means to be shortly described, diaphragm 64 is moved away from the face of housing 60, thereby causing valve 52 to move against seat 54 and valve 72 to move away from seat 74, and against the face of housing 62, thereby forcing the milk from chamber 68 past valve 72 and through line 32 into milk transport line 34.

The immediate control element for alternately effecting connection between pressure line 48 and pump chamber 66 and vacuum line 46 and chamber 66 is a solenoid comprising a housing 82 and a slug 84 loosely and slidably disposed therein adapted upon energization of coil 86 to be retracted against the action of spring 88 and adapted upon de-energization of coil 86 to be moved forward in housing 82 under the action of spring 88. When the slug 84 is retracted, air in pressure line 48, which air is at a pressure higher than atmospheric pressure, and preferably about 20 pounds per square inch, forces the rubber valve blanket section 90 outwardly so that air from line 48 may pass into line 92, through orifice 94, and into chamber 66 by way of line 96. The air in line 92 also passes into a small chamber 98 where it effectively holds rubber valve blanket section 100 in sealing relation between vacuum line 46 and line 102. The pressurized air in line 92 also enters line 104 and forces rubber valve blanket section 106 outwardly to interconnect lines 104 and 108. Line 108 communicates with solenoid housing 82, but the pressurized air is prevented from issuing from the air outlet port 110 of said housing by virtue of the fact that the rearward end of solenoid slug 84 seals port 110 from communication with conduit 108. The pressurized air in pump chamber 66 forces diaphragm 64 against the face of pump housing 62, thereby imparting a pressure pumping stroke to the milk, as previously described.

When solenoid coil 86 is de-energized, spring 88 forces solenoid slug against rubber valve blanket section 90 and the latter is thereby moved to seal off communication between the pressure line 48 and line 92. At the same time air escape port 110 of solenoid housing 82 is brought into communication with line 108 through the space between slug 84 and housing 82, and thus pump chamber 66, which is in communication with line 108 through lines 96 and 104, is connected to atmosphere. When most of the high pressure air has left the system through port 110, the air in chamber 98, the escape of which has been delayed by orifice 94, is sufficiently reduced in pressure to allow spring 113 to move valve blanket section 100 outwardly, thereby connecting the vacuum line 46 with chamber 66 through line 102 and line 96. The vacuum condition in line 104 causes valve blanket section 106 to interrupt communication between line 104 and line 108.

It is thus seen that when coil 86 is energized, the diaphragm 64 is forced against the face of housing 62 and that when coil 86 is de-energized the diaphragm is retracted against the face of housing 60.

Circuit and control means are provided for the solenoid coil 86 whereby said coil will remain energized and the diaphragm 64 will remain in its forward position against the face of housing 62 until such time as an amount of milk, e.g. one pound, has accumulated in releaser 22 sufficient to satisfy the full single stroke capacity of pump 42. With the diaphragm in this position, the high pressure condition within chamber 66 acts through communicating passageway 112 on valve blanket segment 114 causing the latter to move plunger 116 to the right against the action of spring 118. This movement of the plunger 116 yieldingly rocks block 120 in a clockwise direction about pivot 122 to cause stop member 125 to separate switch contacts 126 and 128 and to cause stop member 130 to bring contacts 132 and 134 together. Contacts 126, 128, 132 and 134 are carried by block 120. Thus, with the diaphragm at the forward end of its pressure stroke the coil 86 is held in energized condition by the following holding circuit: battery 136; lead 138; lead 139; normally closed contacts 140 and 142; lead 144; closed contacts 132 and 134; and lead 146 which is connected to coil 86.

When releaser 22 becomes filled with milk to the point where float 148 is lifted above the electrode 150, the current flow through the milk from electrode 150, which is insulated from the releaser 22, to lead 152 through the releaser wall causes relay coil 154 to become energized to cause separation of contacts 140 and 142, thereby breaking the holding circuit for coil 86 and initiating a suction stroke of diaphragm 64.

The suction stroke of diaphragm continues until the diaphragm forces plunger 156 outwardly to cause blanket segment 114 to move plunger 158 outwardly against the action of spring 160 to close contacts 126 and 128. By this time, the flow of current between electrode 150 and lead 152 may have stopped due to downward movement of float 148, thus de-energizing coil 154 and allowing the closing of contacts 140 and 142. Also, at the beginning of the suction stroke of diaphragm 64, plunger 116 moves to the left to allow the counter-clockwise return, under the action of a spring, not shown, of block 120. This allows the normally open contacts 132 and 134 to separate.

The closing of snap acting contacts 126 and 128 by the action of plunger 158 causes coil 86 to be energized along the following bypass circuit: battery 136; lead 138; lead 162; closed contacts 126 and 128; and leads 164 and lead 146. Energization of coil 86 initiates the pressure stroke of diaphragm 64. When this stroke has been completed, the pressure build-up in chamber 66 actuates plunger 116 to pivot block 120 and break contacts 126 and 128 and simultaneously make contacts 132 and 134. Battery 136 thus holds coil 86 energized through the circuit comprising closed contacts 140 and 142 and closed contacts 132 and 134. The coil 86 does not become de-energized, i.e., the diaphragm does not begin another suction stroke until relay coil 154 is again energized to open contacts 140 and 142, such energization taking place upon the raising of float 148 above electrode 150.

The relay comprising coil 154 and contacts 140 and 142 is by itself very sensitive to any degree of current flow between the electrode 150 and lead 152, as when milk coming into the releaser 22 covers the electrode 150 but has not as yet come into the releaser in sufficient volume to raise the float 148 fully above the electrode. Shunt resistance 166 is provided to desensitize the relay and prevent its operation under this condition. Thus, the resistance 166 limits energization of coil 154 so that the relay will not be operated until the float 148 is disposed fully above the electrode 150 thereby eliminating the need for two electrodes at different heights.

It is generally the case that when the milking of a given cow has been finished, the cow will have delivered a plurality of pounds of milk plus the last fraction of a pound which remains in the releaser 22. It is desirable that this fraction of a pound be removed from the releaser before the milking of another cow is begun. This is accomplished by simultaneously moving switches 168 and 170 from, respectively, their positions of engagement with contacts 172 and 174 to engagement with contacts 176 and 178. Such movement of switch 168 effects removal of shunt resistance 166 from the circuit, thereby making relay coil 154 energizable by the low amount of current flowing between electrodes 150 and 152 through the small amount of milk which is in covering relation to electrode 150. Such energization of coil 154 breaks contacts 140 and 142 and de-energizes solenoid coil 86 to initiate a suction stroke of diaphragm 64, thereby effecting removal from the releaser of the small amount of milk therein. When this milk has been fully removed from the releaser, there will be no milk in bridging relation to electrode 150 and the wall of the releaser, and hence there will be no current flow to coil 154. When this condition of no current flow occurs, coil 154 becomes de-energized and contacts 140 and 142 are closed. The movement of switch 170 to engagement with contact 178 enables battery 136 to energize coil 86 upon closure of contacts 140 and 142, without it being required that the diaphragm make a full suction stroke. The partial pressure stroke of diaphragm 64 to effect removal of the last fraction of milk is thus initiated.

The system is provided with visual indicator means whereby it can be determined when the milking operation has been finished and the relative amount of the last portion of milk remaining within the releaser 22, said means comprising a sight glass 180, a stem 182 carried by float 148, and a ball 184 disposed within the sight glass and movable upwardly therein by stem 182. The last fraction of milk in the releaser 22 will raise the float 148 only part way, and this will be indicated by the position of ball 184 in sight glass 180.

The ball 184 serves another function in connection with ball seat 186 carried within line 20. If, for some reason, the milk enters releaser 22 at a faster rate than it can be pumped out, the float 148 will continue to move upwardly until the ball 184 engages the seat 186 which is so formed with respect to the ball that a slight degree of leakage takes place therebetween. Thus, engagement of ball 184 with seat 186 almost completely cuts off the milking vacuum and enables the pumping action to catch up with the milking action. Furthermore, ball 184, being very light in weight, will also be sucked up to the seat 186 to prevent a complete loss of vacuum to all of the other milking units of the system when any sudden rush of air takes place into a releaser 22, as when the claw is kicked off by the cow.

Line 32 is provided at a point between check valves 52 and 72 with means for obtaining an average sampling of all of the milk received from any one cow, such means comprising a conduit 188 formed on line 32 and in communication with the line space between the check valves, and a sampler jar 190 fitted on the end of conduit 188. The resiliency of the air within jar 190 together with the fact that the milk within line 32 between valves 52 and 72 is continually varying in pressure insures that a small amount of milk is exchanged between the jar and line 32 at each full stroke of the pump, thereby obtaining an average sample at the end of the pumping operation.

Means are embodied in the system for automatically registering the amount of milk delivered by any one cow. It has previously been described why the solenoid coil 86 will not become de-energized to initiate a suction stroke until the releaser 22 contains more than enough milk which can be handled by the pump during any one complete stroke. The volumetric capacity of the pump for each complete stroke thereof is a known factor, e.g. one pound of milk. And means comprising the plungers 116 and 158 have been provided to insure that the diaphragm takes a full suction stroke and a full pressure stroke for each cycle of operation. Therefore, all that remains to do to determine the weight of milk delivered by any one cow is to count the full cycles of the pump and to add thereto the fraction of a pound of milk remaining in the releaser and pumped therefrom when the milking operation has been completed. For this purpose, a pump stroke counter is provided, said counter comprising a rotatable wheel 192, numerical indicia 194 disposed on the face thereof, tooth means 196 whereby the counting wheel may be advanced step by step and held in its position of advancement, means for advancing the wheel comprising a lever arm 198, a pawl 200 carried thereby, and solenoid 202 adapted when energized to pivot lever 198 upwardly to cause pawl 200 to advance the wheel one step, spring means, not shown, adapted to return the counter wheel to zero position, a pivotally mounted lever 204 adapted when in the position shown to allow the advance of the wheel but to prevent its return to zero and adapted to be urged out of wheel holding position upon energization of solenoid 206.

It will be appreciated that when switch 170 is in engagement with contact 174 energization of coil 86 to initiate a pressure stroke of the pump will also cause solenoid 202 to be energized since it is then connected with solenoid lead 146 through switch 170 and lead 208. It will further be appreciated that when switch 170 is moved into engagement with contact 178 the final stroke of the pump to remove the last fraction of milk will not be registered on the counter. Also, when switch 168 is moved out of engagement with contact 172 and into engagement with contact 176 to effect a bypassing of shunt resistance 166 and thereby enable coil 154 to be energized when the last fraction of milk is in releaser 22, the solenoid 206 will be energized along with coil 154 to pivot lever 204 out of the holding engagement with teeth 196 and enable the spring return of the counter to zero.

As an incentive to the cows, means are embodied in the system for releasing feed to the individual animals in direct proportion to the amount of milk they deliver, such means comprising a feed chute 210, a delivery spout 212, rotatable feed metering means 214 adapted to release from the chute and to the cow a predetermined amount of feed for each increment of rotation of said metering means, and means comprising teeth 216 formed on the rotatable metering means, a pivotally mounted lever 218, a pawl 220 pivotally connected thereto, and a solenoid 222 for actuating the lever and pawl to effect step by step advancement of the metering means. It will be appreciated that each time the solenoid coil 86 is energized solenoid 222 will be energized to advance the metering means by way of switch 170, contact 174, lead 208 and lead 224. When switch 170 is moved into engagement with contact 178 in connection with the removal from the releaser 22 of the final fraction of milk, solenoid 222 is disconnected from the battery circuit, and thus no feed is delivered to the animal for this final milk fraction.

From the foregoing description it will be seen that the subject apparatus enables the objects initially set forth to be attained. Other advantages not mentioned are inherent in the subject milker system. For example, a lower degree of vacuum is required in this system since the milk is transported under a pressure condition rather than a vacuum system. This enables the use of a smaller vacuum pump. Also, the vacuum system is more efficient and has less fluctuations than the overall vacuum system employed in conventional milker systems. Furthermore, since the milk is transported under pressure conditions, the bothersome factor of the formation of dry milk deposits on the walls of milk-wet vacuum lines which is present in conventional systems is eliminated.

While an embodiment of the apparatus and method of the invention has been shown and described, it is to be understood that all substantial equivalents thereof are considered to be within the spirit and scope of the invention.

What is claimed is:

1. A permanent pipeline milking system adapted for the simultaneous milking of a plurality of cows comprising a plurality of milking stations, a milking claw at each station, a milk releaser at each station, a vacuum system comprising a pulsator line commonly connected to each claw and a suction line commonly connected to each releaser and through each releaser to each claw, a milk delivery line commonly connected to each releaser, a separate milk pump connected to each releaser operable in conjunction with spaced apart pressure-responsive valve means disposed within each releaser, during a single cycle of operation consisting of a full suction stroke, and a full pressure stroke to isolate a predetermined volume of milk within said releaser during a suction stroke and to deliver said volume of milk into said delivery line during a pressure stroke, and separate control means for each pump operable, in response to the delivery into the releaser associated therewith of a given volume of milk amounting to a fraction of the milk to be received from the particular cow during the particular milking operation, to initiate a single cycle of operation of said pump, said valve means within each releaser being operable to prevent any direct communication between said vacuum system and said milk delivery line.

2. A milking system in accordance with claim 1 including means for automatically recording the number of cycles each pump is caused to be operated during the milking of a particular cow.

3. A milking system in accordance with claim 1 including a container sealed against the atmosphere and carried by each releaser in communication therewith between said valve means, whereby an amount of milk is forced into each container during each pressure stroke of the pump associated therewith so that at the end of the milking of each cow an average sampling of its milk will be within a container.

4. A milking system in accordance with claim 1 including liquid level responsive means within each releaser adapted to substantially cut off communication between said suction line and the claw for the releaser when the milk is delivered into the releaser at a materially greater rate than it is removed therefrom by the pump, and valve means for each releaser responsive to a rush of air into a releaser and said suction line to substantially interrupt communication between the releaser and said suction line to thereby prevent a material loss of vacuum within said vacuum system.

5. A permanent pipeline milking system adapted for the simultaneous milking of a plurality of cows comprising a plurality of milking stations, a milking claw at each station, a milk releaser at each station, said releasers being located at substantially the level of said claws when said claws are in use, a vacuum system comprising pulsator means connected to each claw and suction means connected to each releaser and through each releaser to each claw, a milk delivery line commonly connected to each releaser, a separate milk pump connected to each releaser operable to pump milk from each releaser into said delivery line under pressure, and separate control means for each pump operable, in response to each delivery into the releaser associated therewith of a given volume of milk amounting to a fraction of the milk to be received from the particular cow during the particular milking operation, to energize said pump.

6. A permanent pipeline milking system adapted for the simultaneous milking of a plurality of cows comprising a plurality of milking stations, a milking claw at each station, a milk releaser at each station, a vacuum system comprising pulsator means connected to each claw and suction means connected to each releaser and through each releaser to each claw, a milk delivery line commonly connected to each releaser, a separate milk pump connected to each releaser operable to pump milk from each releaser into said delivery line under pressure and means to actuate said pumps.

References Cited in the file of this patent

UNITED STATES PATENTS

| 1,534,939 | Fuge | Apr. 21, 1925 |
| 1,546,437 | Daysh | July 21, 1925 |
| 1,656,124 | Melotte | Jan. 10, 1928 |
| 2,458,779 | Hodsdon | Jan. 11, 1949 |
| 2,725,850 | Makous | Dec. 6, 1955 |

FOREIGN PATENTS

| 1,074,122 | France | Mar. 31, 1954 |